United States Patent [19]

Miericke et al.

[11] 3,780,667
[45] Dec. 25, 1973

[54] ELECTRO-MAGNETIC SYSTEM FOR THE GUIDED SUSPENSION OF A MOVING VEHICLE

[75] Inventors: Jurgen Miericke, Nurnberg; Hans Hieronymus, Erlangen; Franz Pawlitschek, Neunhof, all of Germany

[73] Assignee: Siemens Aktiengesellschaft, Munich, Germany

[22] Filed: Aug. 3, 1972

[21] Appl. No.: 277,612

[30] Foreign Application Priority Data
Aug. 6, 1971 Germany............... P 21 39 506.2

[52] U.S. Cl............... 104/148 MS, 104/148 SS
[51] Int. Cl............................................. B61b 13/08
[58] Field of Search............... 104/148 MS, 148 SS, 104/148 UM; 308/10; 335/219

[56] References Cited
UNITED STATES PATENTS
3,470,828 10/1969 Powell et al................. 104/148 SS OTHER PUBLICATIONS
Powell, James R. et al., "Magnetically Suspended Trains: The Application of Superconductors to High Speed Transport," Cryogenics and Industrial Gases, October, 1969, pp. 19–24

Primary Examiner—Trygve M. Blix
Assistant Examiner—Barry L. Kelmachter
Attorney—Hugh A. Chapin

[57] ABSTRACT

An electromagnetic system for the guided suspension of a moving vehicle above a track or roadbed utilizing along each side of the vehicle pairs of opposed superconducting loops defining elongated tubular cavities therebetween, and a pair of arrays of independent elongated inductive suspension and guidance loops disposed in cruciform arrangement with the suspension loops generally horizontal and the guidance loops generally vertical, the cavities of the vehicle adapted to receive the respective arrays of loops during traverse of the vehicle along the roadbed, whereby the vehicle is suspended above the roadbed by the induced suspension field and guided along the roadbed by the induced guidance field.

16 Claims, 6 Drawing Figures

ELECTRO-MAGNETIC SYSTEM FOR THE GUIDED SUSPENSION OF A MOVING VEHICLE

FIELD OF THE INVENTION

This invention relates to an electromagnetic system for the guided suspension of a moving vehicle.

BACKGROUND OF THE INVENTION

Electrodynamic guided suspension systems for a moving vehicle have been previously known. For example, in U.S. Pat. No. 1,020,943, it has been proposed to have a guided vehicle serve as a carrier for electromagnets capable of carrying large currents to generate lifting forces in interaction with electrically conducting parts of a roadbed so as to counteract the force of gravity on the vehicle and thus maintain the vehicle suspended above the roadbed during motion.

Other electrodynamic guided systems have also been known, such as in U.S. Pat. No. 3,470,828. In one embodiment of this patent as shown in FIGS. 5 to 7, several electromagnetic systems are disposed in tandem relationship on each side of a vehicle in the direction of travel. Each system includes a superconducting loop attached to the vehicle and two oppositely-wound, normal-conducting inductive loops attached to the roadbed underneath the vehicle loop. In addition, two normal-conducting track loops are disposed above the superconducting vehicle loop. The track loops are arranged in parallel relation to each other in the direction of travel and parallel to the vehicle loop and serve to generate a horizontal guidance force for the vehicle. As soon as the vehicle and, therefore, the vehicle loop is deflected horizontally from a center position, a larger flux flows through the lower two track loops than through the upper two track loops. Accordingly, a larger current is induced in these loops to produce a restoring force in the direction toward the null or zero flux position. In the latter equilibrium position, practically no currents are generated in the track loops. This embodiment of the electrodynamic guided suspension has also been called the zero-flux system.

In another embodiment U.S. Pat. No. 3,470,828 (FIGS. 15 to 17), a vertically disposed stabilization loop is arranged above and below the superconducting vehicle loop for the generation of the horizontal guiding force. In still other embodiments, the lifting loops serving to generate the lifting force for the vehicle are arranged vertically next to the vehicle loop (FIG. 11) as well as also horizontally above and below the vehicle loop (FIG. 13). The horizontally arranged lifting loop can further be subdivided into two sub-loops, between which a vertically disposed loop for horizontal stabilization is located (FIG. 19).

In order to damp the oscillations of the vehicle in the horizontal as well as in the vertical direction, corresponding damping loops are provided in each case. These damping loops are generally attached at the roadbed to cooperate with the magnetic fields of the electromagnetic system in such a way that the vehicle is stabilized in the equilibrium position.

In the journal "Cryogenics", June 1971, pp. 192 to 204, a design has been described by Powell and Danby with zero-flux systems, of which one system is arranged on each side of the vehicle and one in the center under the vehicle. Each of the two lateral systems comprises a superconducting loop which is attached at the vehicle and is arranged horizontally, and two normal-conduction track loops, with one arranged above and one below the superconducting loop. These track loops serve to generate the lifting force and are connected in a closed circuit in bucking relation to each other. In addition, these two lifting loops are arranged so that the magnetic forces are in equilibrium if the vehicle loop is situated in the middle between the two lifting loops. In this position, the current in the lifting loops is zero. In a position of the vehicle loop above or below this center position, currents are induced in the lifting loops which result in a corresponding restoring force. The currents in the two lifting loops have opposite directions so that these forces add. The current in the lifting loops is substantially smaller than the current in the vehicle loop as long as the upward lift and the lateral deviation from the center position is kept small.

In the electromagnetic system arranged underneath the vehicle, which has the same construction but is rotated with respect to the other two lateral systems by 90°, the magnetic forces act in the same way. The two track loops induce guidance forces in the horizontal direction which produce horizontal or lateral stabilization of the vehicle. It has also been proposed not to use a third magnet system underneath the vehicle for horizontal stabilization, but to combine the horizontal stabilization with the two lateral magnet systems by providing these lateral systems with additional track loops which divide the two lifting loops. However, these two magnet systems then each contain four lifting loops.

In the journal "Cryogenics and Industrial Gases", October 1969, pp. 19 to 24, Powell and Danby have proposed another embodiment of a zero-flux system which comprises three magnet systems in a plane transverse to the direction of travel of the vehicle for the dynamic guided suspension. In order to generate the lifting force, a lifting system is arranged on both sides of the vehicle and the third system is arranged underneath the vehicle to serve as a stabilization system for generating the horizontal guidance force. The systems each contain two superconducting vehicle loops, so-called quadripole magnets, between which a track loop, arranged parallel to the vehicle loops, is situated. In the stabilization system, the track loop is disposed vertically with the vehicle loops to serve for the generation of the lateral guidance force, and in the two lifting systems, the horizontally arranged track loop serves for the generation of the lifting force. However, this arrangement has a disadvantage in that the weight of the vehicle produces large bending moments in the magnet systems, particularly in the lifting loop.

Accordingly, it is an object of the invention to provide a simplified electromagnetic system for suspending vehicles above a roadbed during travel.

It is another object of the invention to reduce bending moments on the lifting loops of an electromagnetic system to a minimum.

SUMMARY OF THE INVENTION

Briefly, the invention provides an electromagnetic system sometimes hereinafter referred to as a magnet system for the guided suspension of a moving vehicle above a roadbed which comprises along each side of the vehicle two superconducting vehicle loops and stabilizing and guiding track loops. Each pair of vehicle loops are secured to the vehicle in spaced parallel relation to each other and in vertical disposition relative to one another for producing a common magnetic field to generate a lifting force on the vehicle to counteract the force of gravity on the vehicle. The stabilization and guidance track loops are mounted on the roadbed in cruciform disposition between the vehicle loops for generating vertical suspension and horizontal guidance forces on the vehicle.

The invention is based on the recognition that by superimposing the magnetic field configuration of one of the lifting systems with the stabilization system, the effects of the magnetic forces of the two systems is conserved or are influenced only in an inconsequential manner. Thus, the common magnetic field of the two vehicle loops is produced at the same time for the generation of a lifting force which counteracts the force of gravity of the vehicle. As each lifting system is combined with the stabilization system in a 90° relationship thereunder, separate stabilization and suspension systems are therefore no longer necessary. Because of the magnetic field configuration with mutually perpendicular track loops extending in the direction of motion of the vehicle, the lifting force and the horizontal guidance force are generated simultaneously.

Also, a lifting track loop is disposed horizontally between the vertical and mutually parallel vehicle loops. The reaction force to the generated lifting force acts in the direction of braking of the track loops on the roadbed. The bending moment on the lifting loop is therefore small.

The stabilization loop which serves to generate the horizontal guidance force is arranged vertically between the vehicle loops in such a manner that the loop plane thereof intersects the loop plane of the lifting loop. The arrangement can preferably be chosen so that the cross-sections of the lifting loop and the stabilization loop results in a cruciform shape of the assembly. In this case, the loop plane of the lifting loop intersects with the loop plane of the stabilization loop somewhat above the center of the stabilization loop. This construction has the advantage that the weight of the vehicle shifts the equilibrium position approximately to the center of the stabilization loop.

The lifting and stabilization loops may be constructed as conductor coils with several turns. Another particularly advantageous embodiment of the magnet system consists of the provision that the space enclosed by the turns of the vehicle loop is filled at least approximately by the coil or loop, respectively, and that the loop constitutes a plate. These plates can preferably consist of metal, particularly, non-magnetic metal, for instance, aluminum or a light-metal alloy with identical or at least similar properties, which are arranged in tandem in the travel direction of the vehicle in such a manner as to form a bar.

The loop plates can preferably be laminated, such as in the form of individual plates stacked in the manner of a sandwich system. This embodiment has the advantage that only the components of the eddy currents of the vehicle loop are effective for the generation of the lifting force or the stabilizing force, respectively, while the other components, which produce only braking forces and thereby losses, are substantially reduced and in some cases even practically cancelled.

DESCRIPTION OF THE PREFERRED EMBODIMENT

Figure 1:
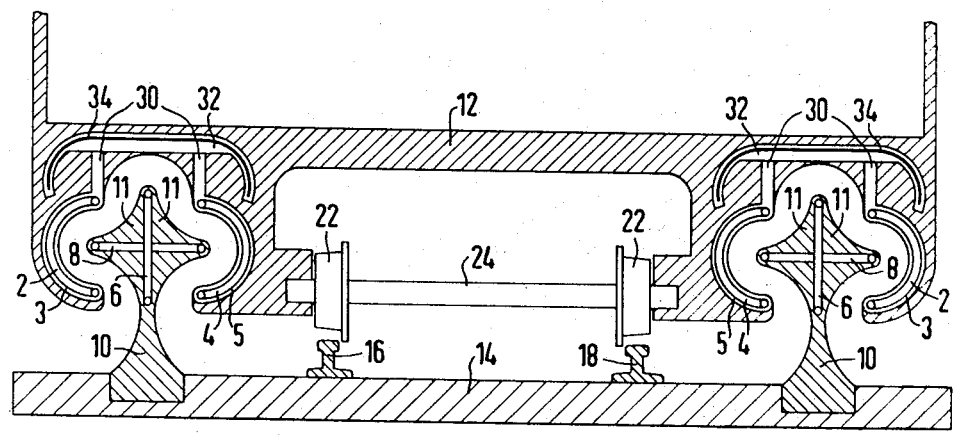
FIG. 1 schematically illustrates a cross-sectional view of a rail vehicle employing a magnet system according to the invention.

Referring to FIG. 1, a vehicle 12 such as a railroad vehicle is provided with two identically constructed magnet systems which are arranged side-by-side in the direction of travel of the vehicle and are located under the chassis of the vehicle 12. Each magnet system includes two superconducting vehicle loops 2, 4 attached to the vehicle 12 and two track loops 6, 8 attached at the roadbed 14. One track loop 6 is disposed in a vertical plane and serves as a stabilizing loop to generate a horizontal guidance force on the vehicle 12 relative to the loop 6. The other track loop 8 is disposed in a horizontal plane and serves as a lifting loop to generate a lifting force on the vehicle 12. The stabilizing track loop 6 and the lifting track loop 8 are constructed and arranged to form a cross-shaped cross-section and are mounted in a support 10 so as to be secured in the roadbed 14. As shown, the spaces in the quadrants formed by the track loops 6, 8 can advantageously be filled with electrically insulating material 11. Also, the insulating material can be shaped so that foreign material will not remain thereon. This effect is obtained with an approximately triangular shape of the quadrants above the horizontal track loop 8.

A pair of rails 16, 18 are mounted on the roadbed 14 while the vehicle 12 is provided with wheels 22 mounted on a rotatable axle 24 to roll on the rails 16, 18 during starting and braking of the vehicle 12. The axle 24 is journalled in a known manner in the chassis of the vehicle 12. In addition, a suitable propulsion means (not shown) is provided to drive the vehicle 12 upon starting with a special drive (not shown) and to brake the vehicle as soon as the velocity of the vehicle drops below a value required for suspension.

Figure 2:
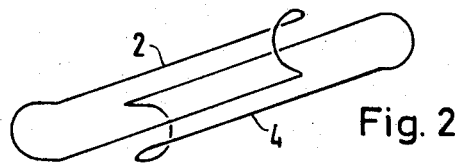
FIG. 2 schematically illustrates two vehicle loops for the magnet system of FIG. 1.

The superconducting vehicle loops 2, 4 are each mounted in a cryostate 3, 5, respectively, along with a coolant, preferably liquid helium, which maintains the loops 2, 4 at a temperature of a few degrees Kelvin required for establishing and maintaining a superconducting state. The vehicle loops 2, 4 are elongated in the direction of travel of the vehicle 12 and may be offset longitudinally outwardly at both ends relative to each other so that the cross-section of each loop 2, 4 forms a ring segment as shown schematically in FIG. 2. One part of the track lifting loop 8 is thus enclosed in each case by the vehicle loops 2, 4.

A pair of ducts 30 are disposed above the vehicle loops 2, 4 to communicate the vehicle loops 2 4 with a supply tank 32 for the coolant. In addition, a field shield 34 which may also be superconducting is mounted in the supply tank 32.

In use, the magnet system serves to guide the vehicle 12 in a suspended manner over the roadbed 14 and rails 16, 18 after a predetermined speed is reached. The vehicle loops 2, 4 and lifting track loop 8 serve to generate the force needed to lift the vehicle while the stabilization track loop 6 serves to generate a horizontal force to guide the vehicle laterally of the bodies 10.

Figure 3:
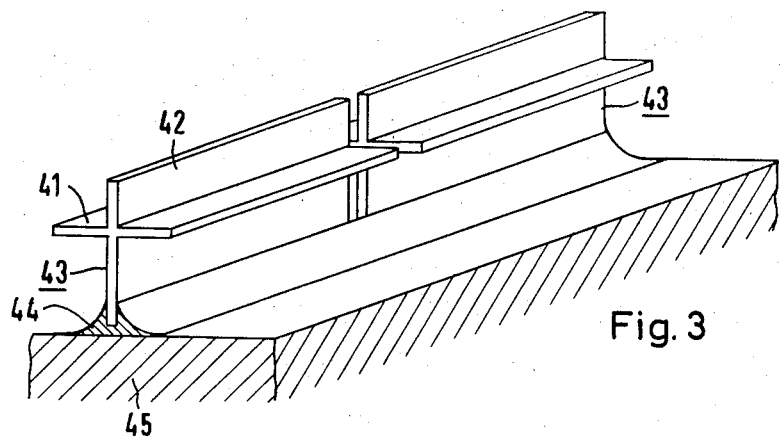
FIG. 3 illustrates a perspective view of a series of spaced common shaped bodies in which the lifting and the stabilizing loops are combined according to the invention.

Referring to FIG. 3, the lifting and stabilization loops 41, 42 can be of plate shape and combined in a common shaped body 43. With this shape, an increase of the mechanical stability and a simpler design, and therefore reduced cost, are obtained. Several of these shaped bodies 43 consisting of plate-shaped loops, can be arranged in tandem in the direction of travel of the vehicle so as to form a rail. In such a case, the shaped bodies 43 are secured on the roadbed 45 by means of a mounting 44. As shown, the plane of the lifting loop 41 intersects the plane of the stabilization loop 42 somewhat above the center of the stabilization loop 42.

Figure 4:
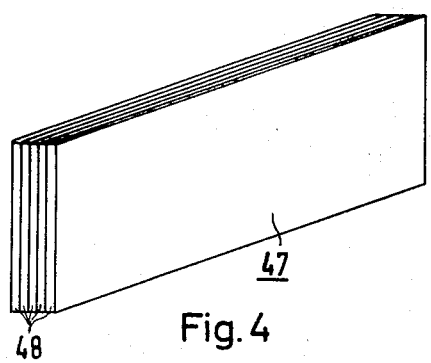
FIG. 4 illustrates a perspective view of a plate-shaped laminated stabilization loop according to the invention.

Referring to FIG. 4, the plate-shaped lifting and stabilization loops may also be constructed in laminated form. For example, the laminated stabilization loop 47 is formed of individual metal plates 48 stacked in the manner of a sandwich system.

Figure 5:
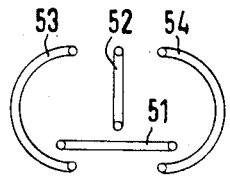
FIG. 5 illustrates an end view of one manner of orienting the lifting and stablizing loops according to the invention.
Figure 6:
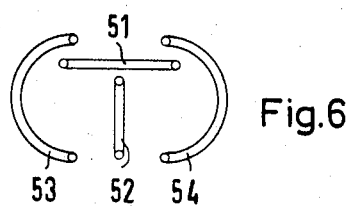
FIG. 6 illustrates an end view of another manner of orienting the lifting and stabilizing loops according to the invention.

It is noted that the guidance force required for lateral stabilization is generally substantially smaller than the lifting force. Therefore, it may be sufficient to arrange a stabilization loop of smaller dimensions than the lifting loop essentially or entirely below or above the lifting loop, as is shown in FIGS. 5 and 6. In these two Figures, the lifting loop is designated with 51, the stabilization loop with 52, and the two vehicle loops with 53 and 54.

The details of energizing the electromagnetic system, propulsion of the vehicle, etc. are well-known in the art and disclosed, for example in aforementioned U.S. Pat. No. 3,470,828.

What is claimed is:

1. A magnet system for the guided suspension of a moving vehicle above a roadbed comprising
   two pairs of superconducting vehicle loops secured along respective sides of the vehicle in spaced parallel relation to one another in vertical disposition for producing a common magnetic field therebetween to generate a lifting force on the vehicle to counteract the force of gravity on the vehicle; and
   respective stabilization inductive track loops mounted on each side of the roadbed in vertical disposition between said vehicle loops for generating a horizontal guidance force on the vehicle simultaneously with the lifting force.

2. A magnet system as set forth in claim 1 wherein said vehicle loops are of elongated shape and are offset longitudinally at the ends relative to each other.

3. A magnet system as set forth in claim 1 which further comprises a supply tank containing a liquid coolant above said vehicle loops and ducts between said tank and said vehicle loops for supplying the liquid coolant to said vehicle loops.

4. A magnet system as set forth in claim 1 further comprising respective lifting track loops disposed perpendicularly to said stabilization loops and between said vehicle loops to generate a magnetic lifting force on said vehicle.

5. A magnet system as set forth in claim 4 wherein each said stabilization loop is disposed below said lifting loop.

6. A magnet system as set forth in claim 4 wherein each said stabilization loop is disposed above said lifting loop.

7. A magnet system as set forth in claim 4 wherein at least one of said stabilization loops and its related lifting loop is a laminated plate.

8. A magnet system as set forth in claim 4 wherein said stabilization loops and said lifting loops are disposed in an integral cruciform relation.

9. A magnet system as set forth in claim 8 wherein each said lifting loop intersects its related stabilization loop at a predetermined distance above the geometric center of such stabilization loop.

10. A magnet system as set forth in claim 8 further comprising electrically insulating material in the quadrants defined by each said cross-shaped stabilization loop and said lifting loop.

11. A magnet system as set forth in claim 10 wherein said electrically insulating material in the quadrants above each said lifting loop are shaped to define a triangular cross-sectional shape with said lifting loop.

12. A magnet system as set forth in claim 4 wherein at least one of said stabilization loops and its related lifting loop is of flat construction.

13. A magnet system as set forth in claim 12 further comprising a plurality of said stabilization loops and said lifting loops disposed in tandem in the direction of travel of the vehicle.

14. A magnet system as set forth in claim 12 wherein at least one of said stabilization loops and said lifting loops is made of aluminum.

15. A magnet system as set forth in claim 12 wherein at least one of said stabilization loops and said lifting loops is made of a light-metal alloy.

16. A magnet system as set forth in claim 12 wherein each said stabilization loop and its said lifting loop are disposed in a common shaped mounting body.

* * * * *